United States Patent
Yano et al.

(10) Patent No.: US 8,279,348 B2
(45) Date of Patent: Oct. 2, 2012

(54) LUMINANCE INFORMATION DISPLAY APPARATUS AND METHOD

(75) Inventors: Koji Yano, Yokohama (JP); Genichi Imamura, Yokohama (JP)

(73) Assignee: Leader Electronics Corporation, Yokohama-shi, Kanagawa (JP)

( * ) Notice: Subject to any disclaimer, the term of this patent is extended or adjusted under 35 U.S.C. 154(b) by 44 days.

(21) Appl. No.: 12/161,259

(22) PCT Filed: Dec. 11, 2007

(86) PCT No.: PCT/JP2007/073873
§ 371 (c)(1),
(2), (4) Date: Aug. 11, 2010

(87) PCT Pub. No.: WO2009/075027
PCT Pub. Date: Jun. 18, 2009

(65) Prior Publication Data
US 2010/0295991 A1    Nov. 25, 2010

(51) Int. Cl.
*H04N 9/815* (2006.01)
*H04N 11/20* (2006.01)

(52) U.S. Cl. ........ 348/631; 348/739; 348/630; 348/453; 348/253; 348/675; 345/604

(58) Field of Classification Search ................. 348/453, 348/661, 663, 645, 642, 630, 631, 671, 675, 348/739, 253; 345/604, 600, 603; 382/169
See application file for complete search history.

(56) References Cited

U.S. PATENT DOCUMENTS
7,336,288 B2 *   2/2008   Kitaura .................. 345/694
2004/0130625 A1   7/2004   Imamura et al.

FOREIGN PATENT DOCUMENTS
| EP | 0 240 971 A2 | 10/1987 |
| JP | 06-351048 | 12/1994 |
| JP | 2003-333629 | 11/2003 |
| JP | 2004-147005 | 5/2004 |

OTHER PUBLICATIONS
European Search Report; European Application No. 07850435.4; dated Dec. 20, 2011, 6 pages, in English.

* cited by examiner

*Primary Examiner* — Jefferey Harold
*Assistant Examiner* — Jean W Desir
(74) *Attorney, Agent, or Firm* — Fish & Richardson P.C.

(57) ABSTRACT

A display method and apparatus are provided for enabling a user, whether or not he has experience, to readily detect a luminance level of a video image with high accuracy. A luminance level of a video signal of a video image is converted to color information to display a change in the luminance of the video image as a change in color. The conversion preferably involves a method of converting the luminance level to color information of three primary colors, red, green, blue, in accordance with a plurality of weights, respectively, a method of converting a luminance level in a predetermined range to color information having a changing rate larger than a changing rate of the luminance level, a method of converting a luminance level out of the predetermined range to color information of a maximum or a minimum level, or the like. Also, the input video signal is preferably displayed together with a converted video image side by side or one on another.

10 Claims, 11 Drawing Sheets

LUMINANCE INFORMATION DISPLAY APPARATUS AND METHOD

TECHNICAL FIELD

The present invention relates to an apparatus and method for displaying luminance information, and more particularly, to an apparatus and the like for displaying a luminance level of a video image.

BACKGROUND ART

In the production of video contents such as production of television programs, production of movies, and the like, images are generally taken while the illumination and imaging conditions are adjusted at the location such that the images can be taken at an optimal luminance in accordance with imaging environments, performance of video cameras, and the like. For this purpose, it is necessary to determine in real time whether or not the luminance level of a taken video image meets the intention of a cameraman at the location. For detecting the luminance level of a video image, generally, a method involves displaying a captured image itself on a picture monitor to detect the luminance level, while another method relies on an image analyzed on a waveform monitor described in FIG. 7(b) of Patent Document 1 to detect the luminance level.
Patent Document 1: JP-2004-147005-A

DISCLOSURE OF THE INVENTION

Problems to be Solved by the Invention

Out of those methods, the former method of detecting the luminance level with a picture monitor is advantageous in that the user can directly visually confirm a taken image itself, but has a problem of the inability to display all luminance information due to limitations in the display performance of the monitor. Since a picture monitor which provides high luminance expression performance cannot be utilized at locations, such as those used in editing rooms, a finished video often differs from that intended by a cameraman due to white clip in a high luminance region of the video and crash in a low luminance region.

In this respect, the latter waveform monitor displays the result of an analysis in a graphical representation in which a video image is represented by the magnitude of luminance level, and therefore is advantageous in that a precise display can be provided from high luminance to low luminance. However, expertise is required to determine from a displayed waveform whether or not the luminance level of a video image is exactly intended by a cameraman.

Accordingly, a need has existed for a display which permits a user, irrespective of whether or not he has experience, to readily and accurately know the luminance level of a video image, and a display device which employs the method.

Means for Solving the Problem

The problems mentioned above can be solved by a display apparatus for displaying a luminance level of a video image, comprising a signal processing circuit for receiving a video signal of a video image to output a luminance level of the video signal, a converter circuit for receiving the luminance level, converting the luminance level to a color signal of one color or a plurality of colors to generate a video signal, and outputting the video signal, and display means for displaying a video image of the converted video signal.

Specifically, the luminance level of a video signal of a video image is converted to color information to display a change in the luminance of the video signal as a change in color. In this way, the user can readily know the luminance level of the video image, and the luminance level can be displayed in a low luminance range and a high luminance range even on a picture monitor which is poor in luminance expression performance.

Here, the converter circuit preferably comprises a converter circuit for converting the luminance level to color signals of three primary colors, red, green, and blue, in accordance with a plurality of weights, respectively. Since the width of representation is increased by a color display using the three primary colors, the luminance level can be more readily known. Also, even a picture monitor which is poor in luminance expression performance can accurately display a luminance level from a low luminance region to a high luminance region.

Further, the converter circuit preferably comprises a converter circuit for converting a luminance level in a predetermined range to a color signal which has a changing rate of a signal level larger than a changing rate of the luminance level. Specifically, by displaying a change in the luminance in a predetermined range of the luminance level with emphasis, the user can know a luminance level in a portion to which the user particularly wishes to look. For example, in a video image such as an image of sunset, which is generally low in luminance level, it is possible to readily detect a luminance level of a portion which would conventionally be crach and therefore could not be correctly displayed by converting the luminance level to a color signal which has a larger changing rate in a low luminance region.

Further, the converter circuit preferably comprises a converter circuit for converting a luminance level out of a predetermined range to a color signal of a maximum or a minimum signal level. Specifically, by converting the luminance level out of the predetermined range to a maximum signal level (for example, white) or a minimum signal level (for example, black), the user can readily know luminance information to which the user wishes to look.

Further, the display means preferably comprises display means for displaying a video image of the video signal input to the signal processing circuit and a video image of the converted video signal arranged side by side. Specifically, a taken video image itself is displayed side by side with the video image of a color signal converted from the luminance level on the display means. In this way, the user can readily know the correspondence relationship between both images.

Further, preferably, the display apparatus comprises a selector circuit for determining whether or not the luminance level falls within a predetermined range, to select a video signal of the video image input to the signal processing circuit and the converted video signal in accordance with a determination result, wherein the display means comprises display means for displaying a video image of a video signal output from the selector circuit. The video image of the video signal output from the selector circuit is a video image of a color signal converted from video signals of pixels which have luminance levels in the predetermined range. In this way, the user can readily know the relationship between a taken image and luminance information.

Also, the aforementioned problem can be solved by a display method for displaying a luminance level of a video image, comprising a processing step of detecting a luminance level of video data of an input video image, a conversion step of converting color information of the video data to video data of one color or a plurality of colors in accordance with the luminance level to generate video data, and a display step of displaying a video image of the converted video data.

With digitization in recent years, video information of video images has been generally transmitted in the form of digitized video data. Such processing for converting luminance information of digital data to color information can be understood as a general display method which can be described in software.

Here, the conversion step may include the step of converting the luminance level to color information of three primary colors, red, green, blue, in accordance with a plurality of weights, respectively, or the step of converting a luminance level in a predetermined range to color information to a color signal which has a changing rate of a signal level larger than a changing rate of the luminance level, or the step of converting a luminance level out of a predetermined range to a color information of a maximum or a minimum signal level, thereby allowing the user to more readily know a range of luminance level which is desired by the user.

Also, in the display step, the input video image and a video image of the converted video data may be displayed side by side, or in the conversion step, the luminance level may be converted to color information to generate video data only when the luminance level falls within a predetermined range. Specifically, by displaying the taken video image and the converted video image side by side or one on another, the user can more readily know the correspondence relationship between both video images.

Effects of the Invention

The present invention can provide a method and apparatus which enables the user, irrespective of whether or not the user has experience, to readily know the luminance level of a video image with high accuracy.

Other features, aspects, and advantages of the present invention will be better understood by referring to the following description, appended claims, and accompanying drawings.

DESCRIPTION OF REFERENCE NUMERALS

11 Signal Processing Circuit
12 Converter Circuit
13 Selector Circuit
14 Display Control Circuit
15 Display

BEST MODE FOR CARRYING OUT THE INVENTION

Figure 1:
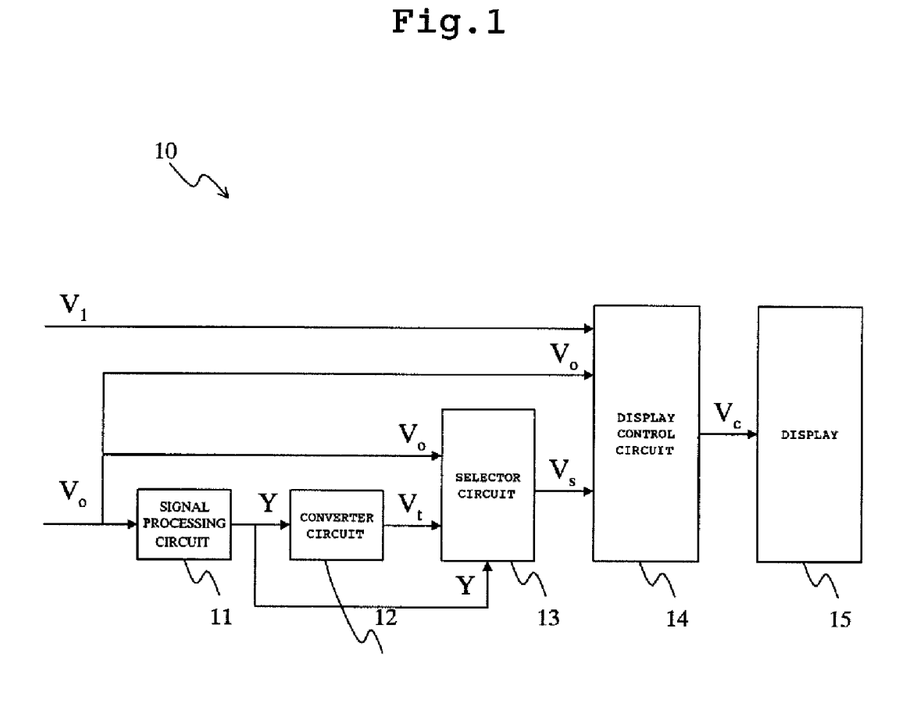
FIG. 1 A schematic diagram of the configuration of a luminance information display apparatus according to the present invention.

FIG. 1 is a schematic diagram of the configuration of a luminance information display apparatus 10 according to the present invention. Arrows in the figure indicates flows of video signals. The luminance information display apparatus 10 comprises a signal processing circuit 11 which receives video signal $V_0$ of a video image to output a luminance level Y of the video signal; a converter circuit 12 which receives the luminance level Y, converts the luminance level Y to a color signal to generate a video signal $V_f$, and outputs the video signal $V_f$; a selector circuit 13 which receives three signals, i.e., the luminance level Y and video signals $V_0$, $V_1$ to selectively output a video signal $V_s$ for one of the video signal $V_0$ and video signal $V_f$ based on the luminance level Y; a display control circuit 14 which receives the video signals $V_0$, $V_s$ and a video signal $V_1$ of another video image, processes these signals to generate a video signal $V_c$ of a video image which is to be displayed on a display 15; and the display 15 for displaying a video image of the video signal $V_c$.

The signal processing circuit 11 is a circuit for detecting the luminance level Y of the video signal $V_0$ of the input video image. In the luminance information display apparatus 10 of this embodiment, since the input video signal $V_0$ is a digital composite signal, the signal processing circuit 11 comprises a circuit for separating the luminance level Y from video data of a composite signal, but the circuit configuration can be designed as appropriate in accordance with a standard to which an input video signal conforms. For example, when an input video signal is an RGB signal, the luminance level Y can be calculated by multiplying the signal level of each of RGB signals by a coefficient and summing the results together. On the other hand, when an input signal is an analog signal, the luminance level Y of the analog signal may be detected by a Y/C separator circuit, or the analog signal may be converted to digital video data through D/A conversion, followed by numerical processing for deriving the luminance level Y.

The converter circuit 12 is a circuit for converting the luminance level Y to a color signal to generate and output the video signal $V_f$. A composite signal input to the luminance information display apparatus 10 of this embodiment comprises digital data of the luminance level Y represented by ten bits (1024 levels of gradation from 0 to 1023), and digital data of color signals which represents red (R), green (G), and blue (B) respectively represented by eight bits (256 levels of gradations from 0 to 255). Accordingly, the converter circuit 12 converts the 10-bit luminance level Y to RGB color information, each having eight bits, to generate the video signal $V_f$.

While converted color information may be a monochrome or color, a conversion to colors involves a conversion of the luminance level Y to a color signal of each of red (R), green (G), and blue (B) in accordance with weighting previously specified by a user. Also, the converter circuit 12 has a function of emphasizing a luminance level in a range desired by the user in the conversion by a method of increasing changes of the color signals to a change of the luminance level Y only in a particular range of luminance level, or converting to a maximum (for example, white) or a minimum (for example, black) signal level when an input luminance level falls out of a predetermined range, and the like. The converting procedure will be described later. In this regard, when an input luminance level Y is an analog signal, the analog signal may be converted to digital video data through D/A conversion before it is converted to color information through digital numerical processing, or the analog luminance level Y may be converted to color signals through analog signal processing to output an analog video signal.

The selector circuit 13 is a circuit for outputting the video signal $V_t$ output from the converter circuit 12 when the input luminance level signal Y falls within a range previously specified by the user, and for outputting the video signal $V_0$ of the video image input to the signal processing circuit 11 when the signal falls without the range. The selector circuit 13 comprises a determination circuit for determining whether or not the luminance level Y falls within a predetermined range to output a determination result signal, and a multiplexer for selectively outputting one video signal $V_s$ of the video signal $V_0$ and video signal $V_t$ based on the determination result signal. In this regard, in the luminance information display apparatus 10 of this embodiment, the video signal $V_0$ is a composite signal while the video signal $V_s$ output from the selector circuit 13 is an RGB signal, so that the selector circuit 13 converts the composite signal to the RGB signal.

The display control circuit 14 is a circuit which receives the video signal $V_0$ of the input video image, the video signal $V_s$ output from the selector circuit 13, and another video image $V_1$, converts the number of pixels of the video images to a predetermined number of pixels in order to display the respective video images on the display 15 at displayed positions and in a display method set by the user, and generates a video signal $V_c$ which comprises each of the video images laid out at predetermined positions. Since the luminance information display apparatus 10 of this embodiment also comprises a waveform monitor and a function of determining whether or not the signal level of an input video image conform to a broadcasting standard, these results are input to the display control circuit 14 as the video signal $V_1$ to generate the video signal $V_c$ of a video image arranged side by side together with the video signals $V_0$ and $V_s$.

The display 15 is a display for displaying the video image of the video signal $V_c$ in colors. While the luminance information display apparatus 10 of this embodiment employs a liquid crystal display, the display 15 may be another color video display device such as a Braun tube monitor or the like.

Next, the operation of the luminance information display apparatus 10 will be described along a flow chart of FIG. 2. As a video signal $V_0$ of a taken video image is input, the signal processing circuit 11 detects the luminance level Y from the video signal $V_0$ (step 21). Next, the converter circuit 12 converts the luminance level Y to color signals to generate a video signal $V_t$ (step 22). Next, the selector circuit 13 determines whether or not the luminance level Y falls within a predetermined level (step 23), selects the converted video signal $V_t$ (step 24) when it falls within the predetermined level, selects the video signal $V_0$ of the input video image when it falls out of the predetermined range (step 25), and outputs the selected video signal $V_s$.

In the video signal $V_s$, video signals of pixels of the input video image $V_0$, the luminance level Y of which falls within the predetermined range are replaced with the video signal $V_t$. Accordingly, the video image of the output video signal $V_s$ is a superimposed image which is composed of the video image (region 82 in FIG. 8), and the input video image $V_0$ (region 83 in FIG. 8). In this regard, the converted video signal $V_t$ alone can be output as the video signal $V_s$ by setting the range of the luminance level to a full range (from 0% to 100%).

Next, the display control circuit 14 converts the video signals $V_s$, $V_0$ to a proper number of display pixels, and generates a video signal $V_c$ of a video image which is laid out in a specified display format, together with the video image $V_1$ of a waveform monitor or the like (step 26). Finally, the image of the video signal $V_c$ is displayed on the display 15 (step 27).

Figure 9:
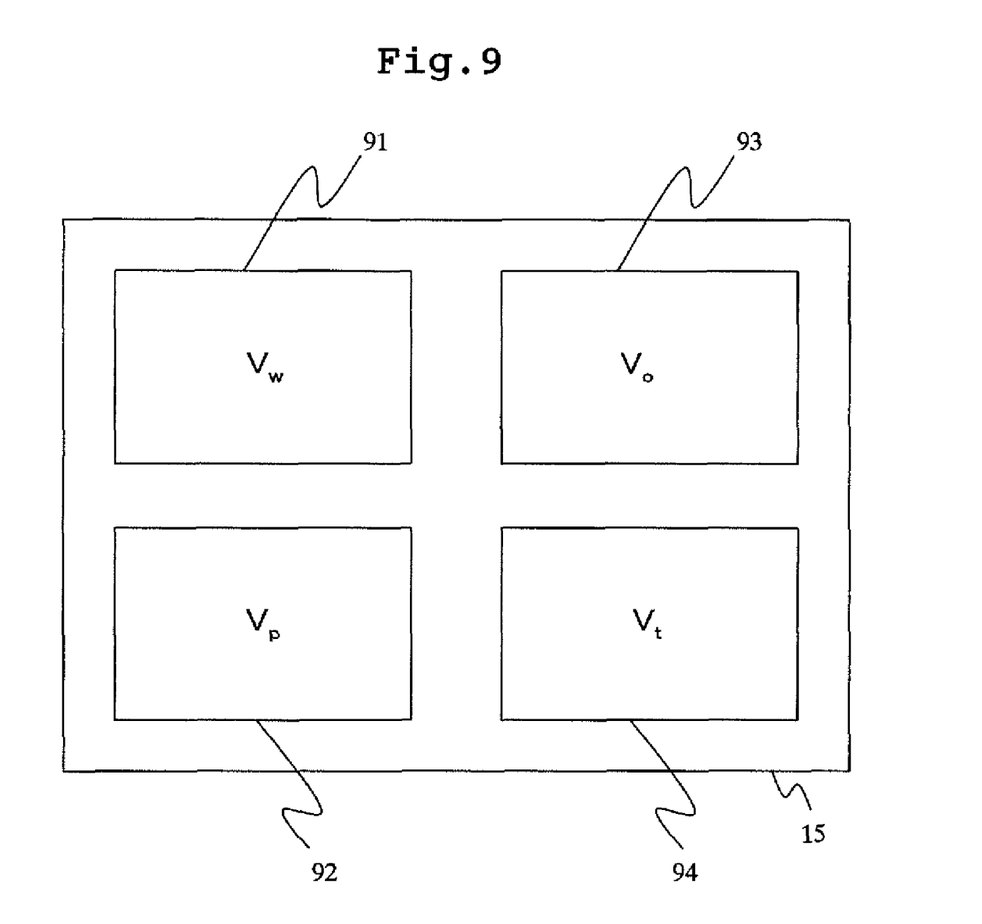
FIG. 9 Another exemplary display of the luminance information display apparatus.

FIG. 9 shows the screen of the display 15 which is divided into four, where the input video image $V_0$ is displayed in an area 93, a video image of the converted video signal $V_t$ in an area 94, a video image $V_w$ of a waveform monitor in an area 91, and a video image $V_p$ which indicates a correspondence relationship between the signal level of the video image $V_0$ and a broadcasting standard in an area 92, respectively, in parallel. In this event, at step 26, the display control circuit 14 is applied with the video signals $V_0$, $V_s$, $V_w$, $V_p$ of the respective video images, and converts the resolution of the respective video signals to images corresponding to a resolution one quarter as low as the screen of the display 15 to generate the video signal $V_c$ in which the respective video images are arranged at proper positions.

Next, step 22 for converting the luminance level Y to generate the video signal $V_t$ in the converter circuit 12 will be described in greater detail in connection with several embodiments.

Figure 3:
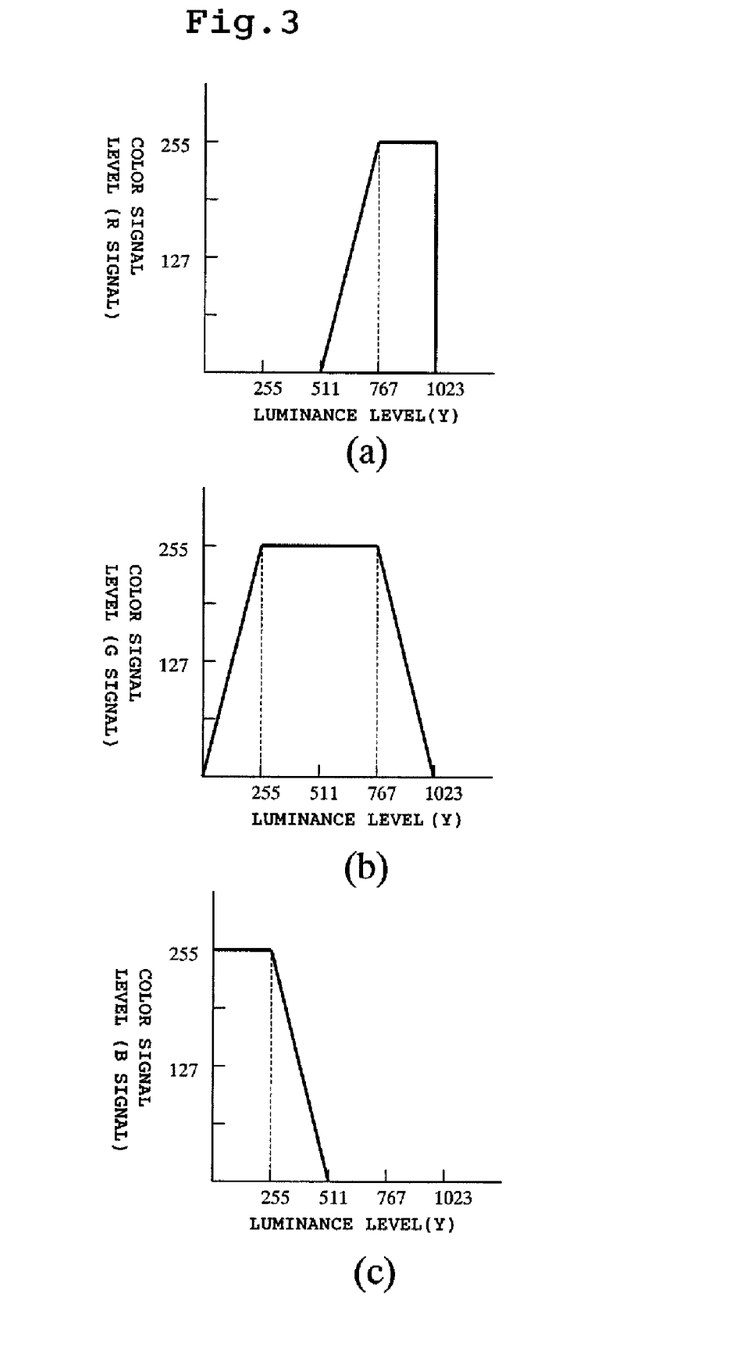
FIG. 3 A diagram showing weighting to each color signal for a luminance level.

First, a description will be given of an example of converting the luminance level Y to a color signal level in accordance with weighting shown in FIG. 3. Prior to a description on a specific processing procedure, the relationship between the luminance level Y and converted color information will be described in brief. In each graph of FIG. 3, the horizontal axis represents the luminance level Y, while the vertical axis represents the signal level of the converted color signal. FIG. 3(a) shows weighting of a color signal of red (R) to the luminance level Y; FIG. 3 (b) shows weighting of a color signal of green (G) to the luminance level Y; and FIG. 3 (c) shows weighting of a color signal of blue (B) to the luminance level Y, respectively.

As Y=0 is entered, this results in R=G=0 and B=255, so that the converted color information becomes blue. In a region of 0<Y≦255, the level (0) of the R signal and the level (255) of the B signal remain unchanged, whereas the level of the G signal increases as the level of Y increases. For this reason, the converted color information continuously changes from blue to cyan. In a region of 255<Y≦511, the level (0) of the R signal and the level (255) of the G signal remain unchanged, whereas the level of the B signal decreases as the level of Y increases. For this reason, the converted color information continuously changes from cyan to green. In a region of 511<Y≦767, the level (255) of the G signal and the level (0) of the B signal remain unchanged, whereas the level of the R signal increases as the level of Y increases. Accordingly, the converted color information continuously changes from green to yellow. In a region of 767<Y≦1023, the level (255) of the R signal and the level (0) of the B signal remain unchanged, whereas the level of the G signal decreases as the level of Y increases. For this reason, the converted color information continuously changes from yellow to red. In the end, the luminance level is converted to a color signal which gradually changes to blue, cyan, green, yellow, and red as the level of Y increases.

Figure 4:
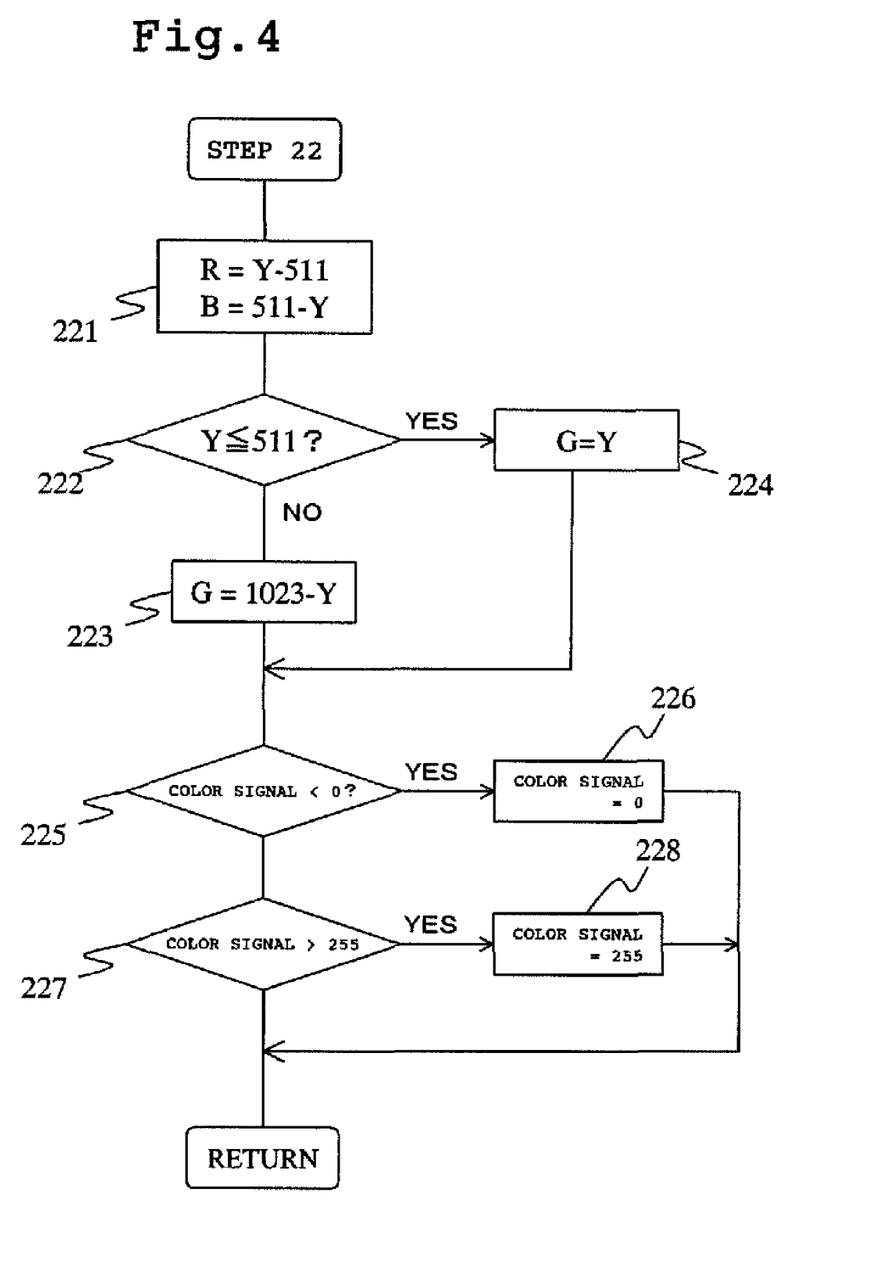
FIG. 4 A flow chart of a process for a conversion of a luminance level to color signals.

Next, a specific processing method for the conversion in accordance with the weighting of FIG. 3 will be described with reference to a flow chart of FIG. 4. First, preliminary signal levels are found for the R signal and B signal through numerical operations represented by R=Y−511 and B=511−Y (step 221). Next, it is determined whether or not the luminance level Y is lower than 511 (step 222), and a preliminary signal level of the G signal is calculated through an operation represented by G=1023−Y (step 223) when larger, while the luminance level Y is set to a preliminary level of the G signal when smaller (YES) (step 224). In this regard, at the stage of the preliminary signal level, a video data value can take a value which is negative or exceeds 255.

Next, when the preliminary signal level of each of the color signals R, G, B, found at steps 221-224 is a negative value (step 225), the signal level of the color signal is set to zero (step 226). On the other hand, when the preliminary signal level of each of the color signals R, G, B is higher than 255 (step 227), the signal level of the color signal is set to 255 (step 228). When the data value of the preliminary signal level remains between 0 and 255, the data value is set to the signal level of the converted color signal. From the foregoing, the luminance level Y is converted to color signals of three primary colors, red, green, blue, in accordance with the weighting shown in FIG. 3.

Figure 5:
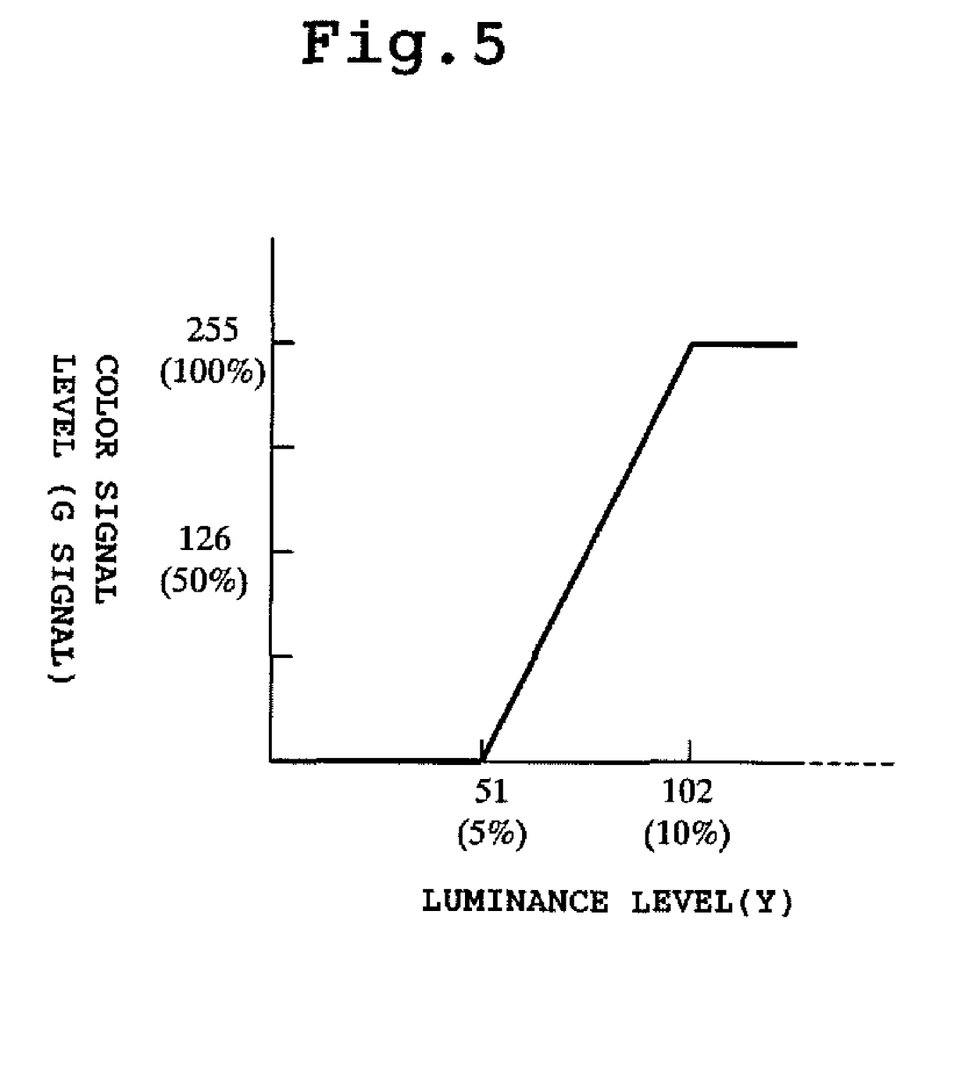
FIG. 5 A diagram showing weighting to a G signal for a luminance level.
Figure 6:
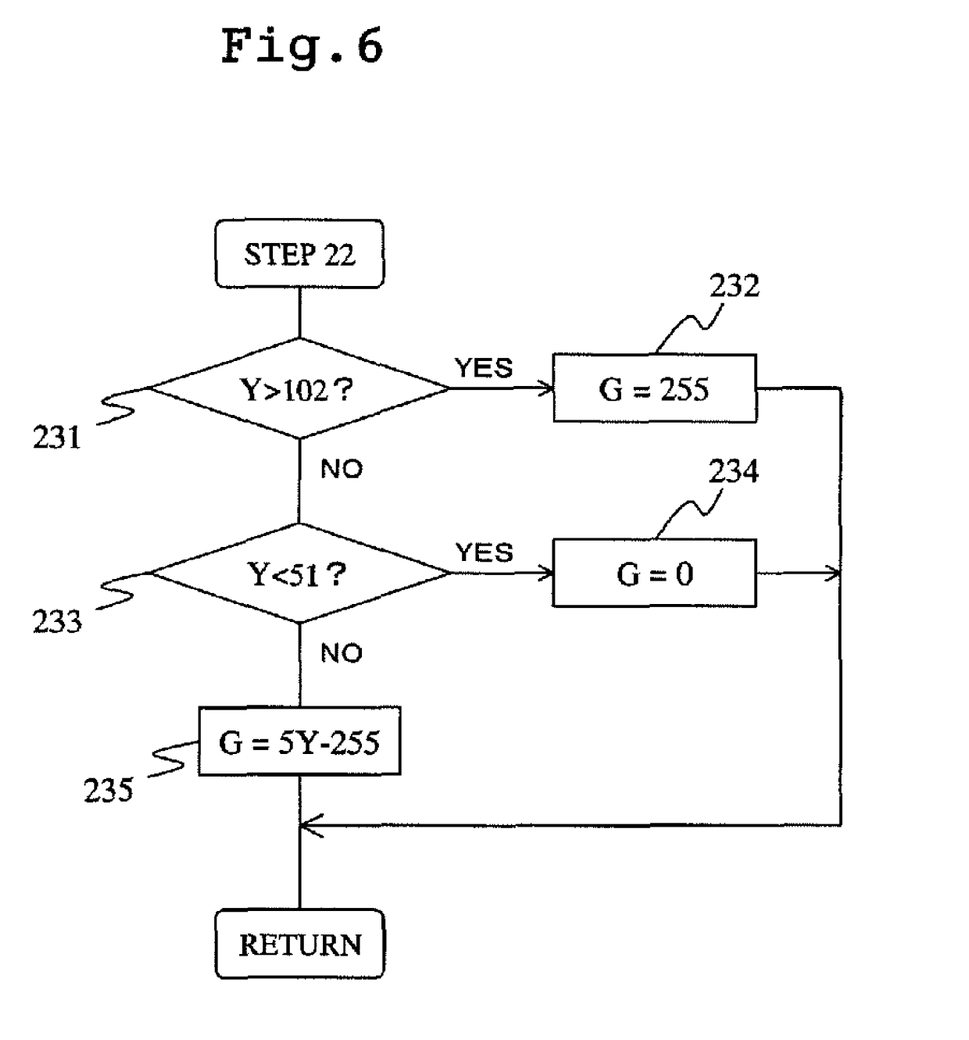
FIG. 6 A flow char of a conversion process for a conversion with an emphasis for a predetermined range.

FIG. 5 shows another example of weighting. In FIG. 6, the luminance level Y in a range (predetermined range) of 5% to 10% is converted to contrast color information of single green color. It should be noted that in the description of this example, the level may be written in the proportion to a maximum value for convenience of description. For example, since a data value of the luminance level Y ranges from 0 to 1023, 5% corresponds to 51 (=1023*5/100); 10% to 102 (=1023*10/1000). Also, since the signal level of the color signals ranges from 0 to 255, 50% corresponds to 126 (=255*50/100), and 100% to 255 (=255*100/100).

First, the conversion in FIG. 5 will be described in brief. In a region of 0%≦Y<5% and a range of 10%<Y≦100%, which are out of the predetermined range, the level of the G signal is set to a minimum (0%) and a maximum (100%), respectively. On the other hand, in the predetermined range of 5%≦Y≦10%, a conversion is made such that the level of the G signal increases by 10% as the level of Y increases by 1%. In other words, the conversion is made such that a changing rate of the level of the color signal is larger than a changing rate of the luminance level Y.

Next, a specific processing method for the conversion in accordance with the weighting in FIG. 5 will be described with reference to a flow chart of FIG. 6. First, it is determined whether or not the luminance level Y is larger than 102 which is one boundary value of the predetermined range (step 231), and the signal level of the G signal is set to 255 which is a maximum signal level when larger (step 232). On the other hand, it is determined whether or not the luminance level Y is lower than 51 which is the other boundary value (step 233), and the signal level of the G signal is set to 0 which is a minimum signal level when smaller (step 234). When the luminance level Y falls within the predetermined range (51≦Y≦102), the luminance level Y is converted to the signal level of the G signal in accordance with an equation G=5Y−255. From the foregoing, the luminance level Y is converted to the color signal of green in accordance with the weighting shown in FIG. 5. In this regard, since the luminance level is converted to color information of one green color, the signal levels of the R signal and B signal are zero at all times.

In the luminance information display apparatus 10 of this embodiment, the user can set boundary values of a range of the luminance level which is displayed with emphasis as an arbitrary data value or a proportion to a maximum. Also, the correspondence relationship between the luminance level Y and the signal level of the color signal can also be set in various ways. For example, when the signal level is all set to 0% out of the predetermined range, as shown in FIG. 7(a), it is possible to more readily understand a distribution of and a change in the luminance level within the predetermined range. In addition, as shown in FIG. 7(b), the weighting can be set such that a non-linear correspondence relationship is established between the luminance level Y and the signal level.

Figure 10:
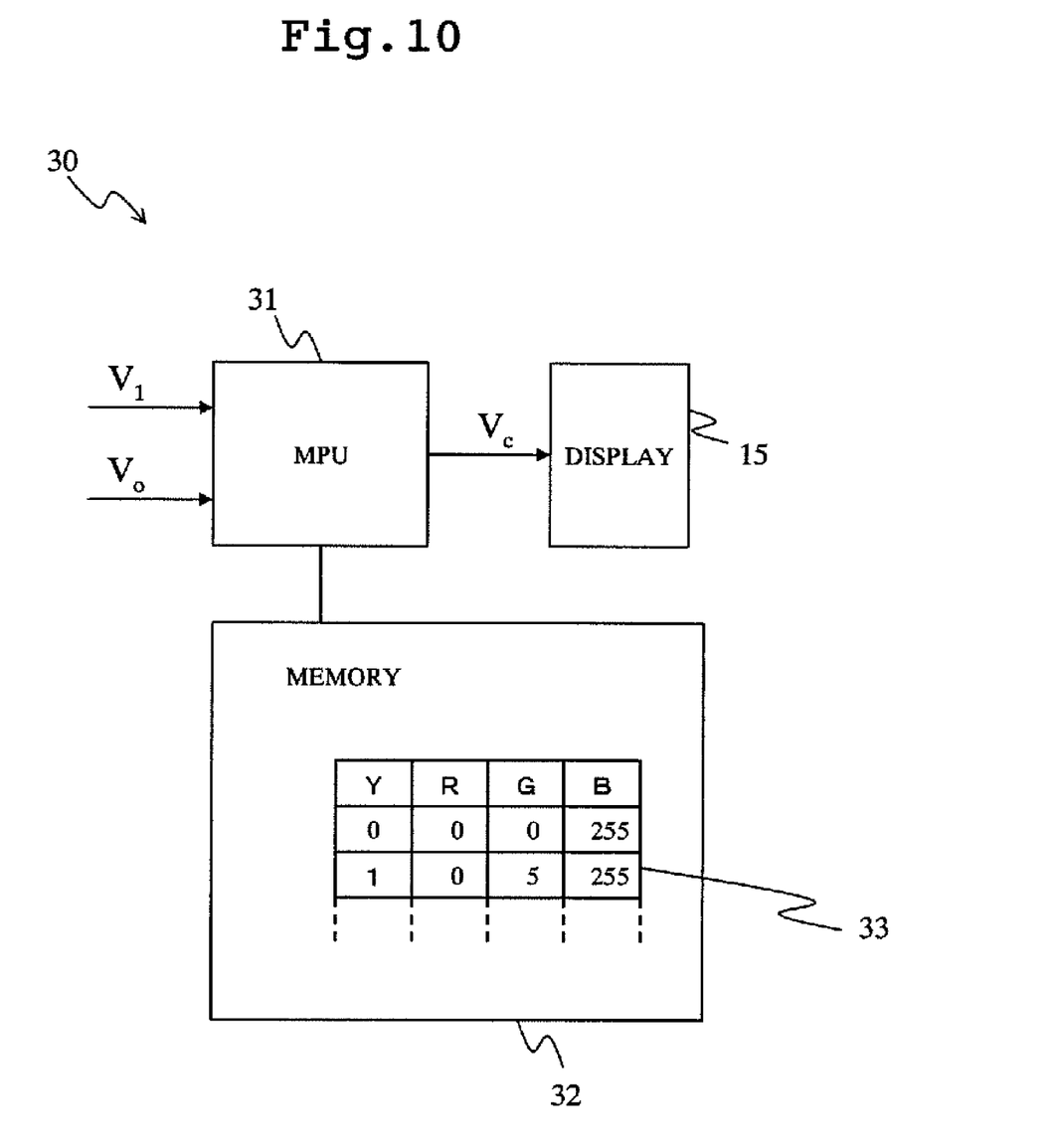
FIG. 10 A schematic diagram of the configuration of another luminance information display apparatus according to the present invention.

FIG. 10 shows a schematic diagram of the configuration of another luminance information display apparatus 30 of the present invention. In the luminance information display apparatus 30, all processing except for display is implemented by software-based operational processing. For this purpose, the luminance information display apparatus 30 comprises a microprocessor unit (MPU) 31 which has a numerical value operation function, and a memory 32 connected to the MPU 31 and a display 15 in a simple hardware configuration.

The MPU 31, which is a unit that receives video data $V_0$ of an input video image, and video data $V_1$ of another video image such as that from a waveform monitor or the like, and outputs video data $V_c$ of a video image which is to be displayed on the display 15, is comprised of an interface of a digital data numerical value processing circuit to an external circuit.

Figure 7:
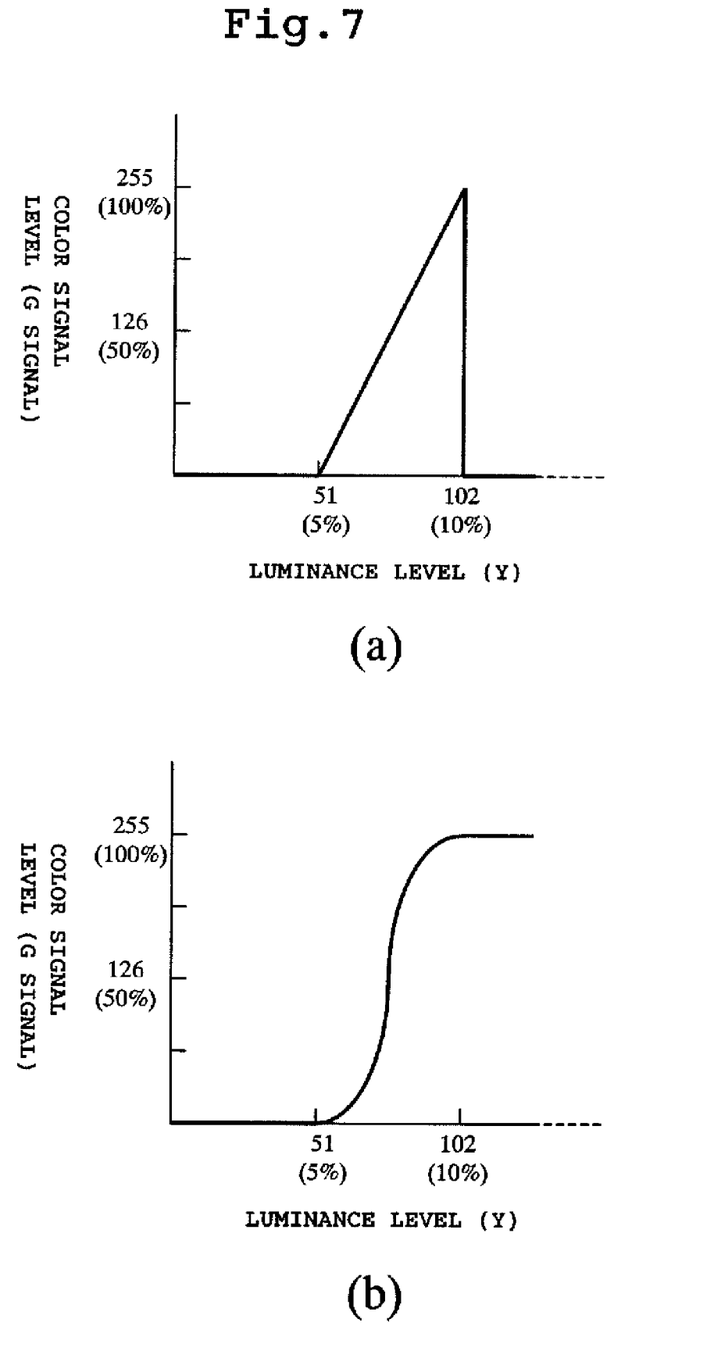
FIG. 7 A diagram showing weighting to a color signal for a luminance level.

The memory 32 stores a look-up table 33 which contains the luminance level Y and weighting for converted color information. For example, the values on the vertical axis (color information of RGB) corresponding to each value on the horizontal axis (luminance level Y) in FIGS. 3, 5, 7 are recorded as a table.

Figure 11:
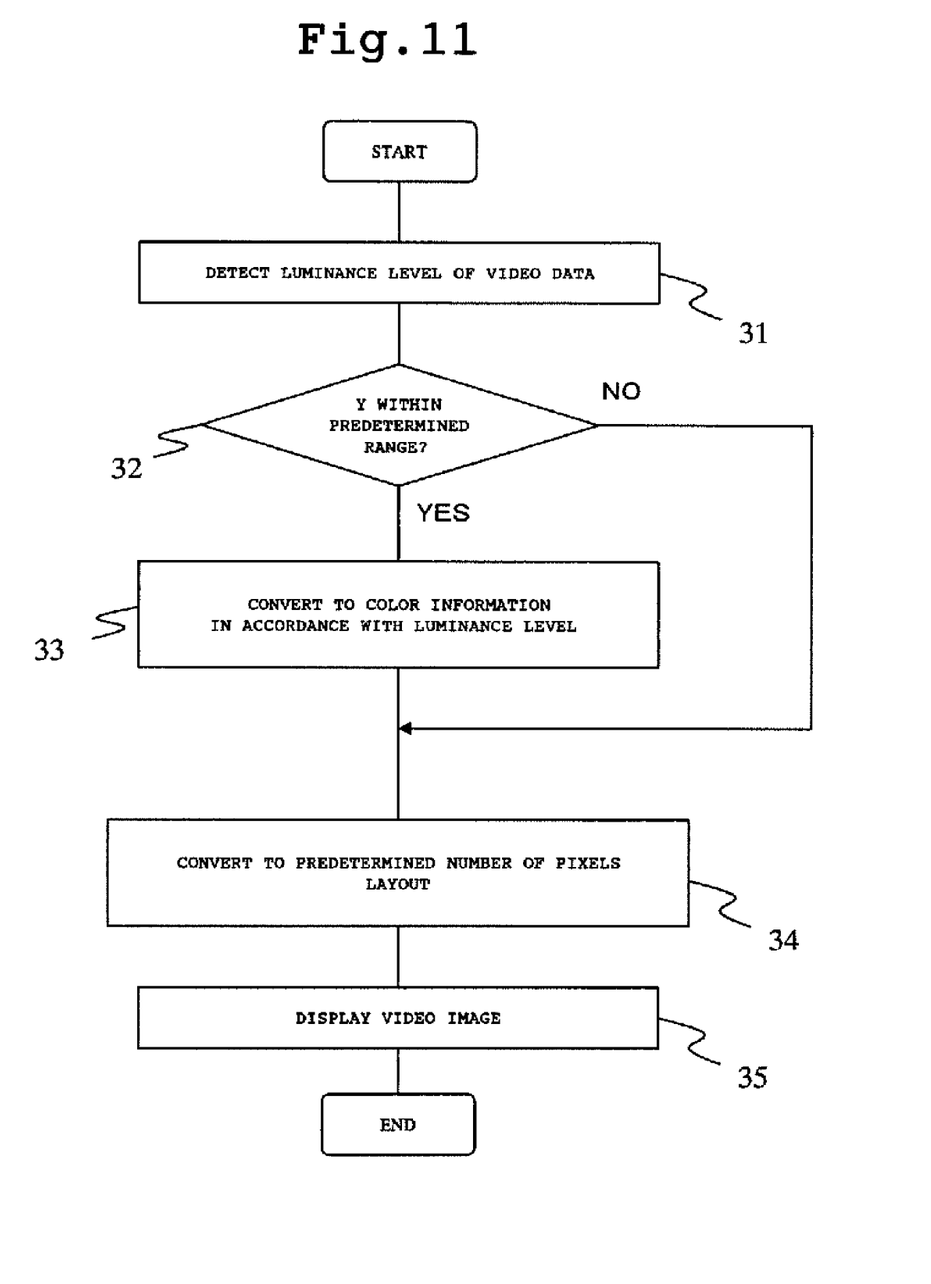
FIG. 11 A flowchart showing the operation of the other luminance information display apparatus according to the present invention.

Next, the operation of the luminance information display apparatus 30 will be described with reference to a flow chart of FIG. 11. As a video data $V_0$ of a video image is input, the MPU 31 first detects the luminance level Y from the video data (step 31). Next, the MPU 31 determines whether or not the luminance level Y falls within a predetermined range (step 32). When within the predetermined range, the MPU 31 rewrites the luminance level Y to video data which converts into color information in accordance with the weighting in the table stored in the memory 32 (step 33).

Figure 8:
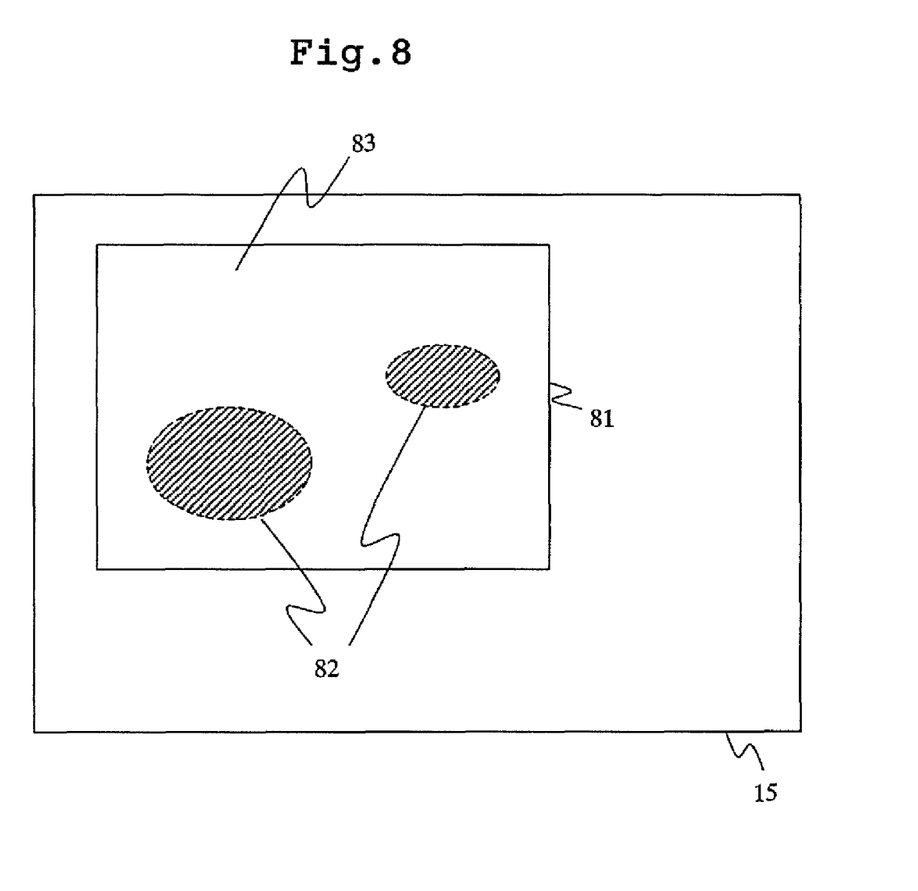
FIG. 8 An exemplary display of the luminance information display apparatus.

By this rewriting, a video image 81 of FIG. 8 is generated, where color information of only video data of the video data $V_0$ of the input video image, the luminance level of which falls within the predetermined range, is rewritten. It should be noted that by setting the predetermined range to the full range (from 0% to 100%), all color information of the video data can be written. Next, the resulting video data is converted to the number of pixels in accordance with a display to generate video data $V_c$ which is laid out together with video data such as a waveform monitor or the like (step 34). Finally, the display 15 displays a video image of the video data $V_c$ (step 35).

While the technical idea according to the present invention has been described in detail with reference to particular embodiments, it is apparent to those skilled in the art to which the present invention belongs that a variety of modifications and alternations can be added without departing from the spirit and scope of the claims. The foregoing description has been made for purposes of illustration, and is not intended to be exhaustive or limited to the disclosed form. Variations and modifications can be made, and they are encompassed in the scope of the embodiments described in the appended claims.

Figure 2:
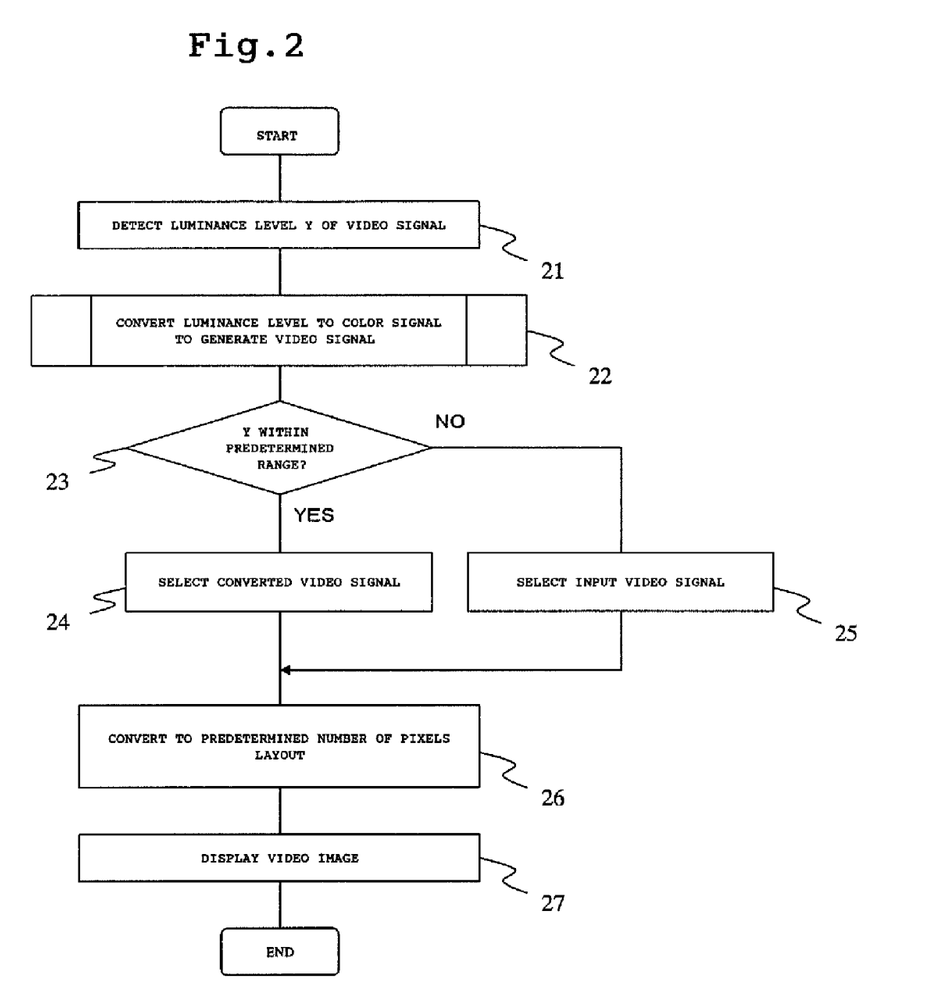
FIG. 2 A flow chart showing the operation of the luminance information display apparatus according to the present invention.

For example, the flow chart of FIG. 2 may be described in software, and executed by the luminance information display apparatus 30. In this event, since the luminance level of all video data is converted to color information at step 22, higher numerical value processing performance is required for the MPU 31. As countermeasures to this, functions of portions of each circuit of the luminance information display apparatus shown in FIG. 1 which require high speed processing may be implemented by electronic circuits, and the remaining portion may be implemented in software.

The invention claimed is:

1. A display apparatus for displaying a luminance level of a video image on a display, comprising:
 a signal processing circuit for receiving a video signal and detecting a luminance level of the video signal;
 a converter circuit for receiving the luminance level, converting the luminance level to a color signal of one color or a plurality of colors to generate a converted video signal, and outputting the converted video signal; and
 a selector circuit for determining whether the luminance level falls within a predetermined range, and selectively outputting one of the video signal received by the signal processing circuit and the converted video signal, in accordance with the determination result.

2. A display apparatus according to claim 1, wherein:
 the converter circuit converts the luminance level to color signals of three primary colors, red, green, and blue, in accordance with weights.

3. A display apparatus according to claim 1, wherein:
 the converter circuit converts a luminance level in a predetermined range to a color signal which has a changing rate of a signal level larger than a changing rate of the luminance level.

4. A display apparatus according to claim 1, wherein:
 the converter circuit converts a luminance level out of a predetermined range to a color signal of a maximum or a minimum signal level.

5. A display apparatus according to claim 1, wherein further comprising:
 a display control circuit for controlling a video image to be displayed on a display, to thereby display both of the video image of the video signal inputted to the signal processing circuit and the video image of the converted video signal, arranged side by side on the display.

6. A method for displaying a luminance level of a video image, the method comprising:
 detecting a luminance level of an input video signal:
 converting the luminance level to a color signal of one color or a plurality of colors to generate a converted video signal;
 determining whether the luminance level falls within a predetermined range; and
 selectively outputting one of the video signal received by the signal processing circuit and the converted video signal, in accordance with the determination result.

7. A method according to claim 6, wherein at the step of converting, the luminance level is converted to color signals of the three primary colors, red, green and blue colors, in accordance with weights.

8. A method according to claim 6, wherein at the step of converting, when the luminance level is in a predetermined range, the luminance level is converted to a color signal which has a changing rate of a signal level larger than a changing rate of the luminance level.

9. A method according to claim 6, wherein at the step of converting, when the luminance level is out of a predetermined range, the luminance level is converted to a color signal of a maximum or a minimum signal level.

10. A method according to claim 6, further comprising:
 controlling a video image to be displayed on a display, to thereby display both of the video image of the video signal inputted to the signal processing circuit and the video image of the converted video signal, arranged side by side on the display.

* * * * *